United States Patent [19]

Clark et al.

[11] Patent Number: 4,962,586

[45] Date of Patent: Oct. 16, 1990

[54] METHOD OF MAKING A HIGH TEMPERATURE - LOW TEMPERATURE ROTOR FOR TURBINES

[75] Inventors: Robert E. Clark, Orlando; Robert L. Novak, Winter Springs, both of Fla.; Dennis R. Amos, Rock Hill, S.C.

[73] Assignee: Westinghouse Electric Corp., Pittsburgh, Pa.

[21] Appl. No.: 442,966

[22] Filed: Nov. 29, 1989

[51] Int. Cl.⁵ .............................................. B21K 3/04
[52] U.S. Cl. ..................................... 29/889.2; 29/458; 228/263.15; 228/208
[58] Field of Search ............... 29/156.8 R, 458, 527.2, 29/530, 889.2; 228/208, 231, 263.15; 219/76.14, 76.15, 76.16

[56] References Cited

U.S. PATENT DOCUMENTS

| | | | |
|---|---|---|---|
| 2,637,521 | 5/1953 | Constantine et al. | 29/156.8 R |
| 3,975,612 | 8/1976 | Nakazaki et al. | 219/121 |
| 4,241,110 | 12/1980 | Ueda et al. | 427/203 |
| 4,270,256 | 6/1981 | Ewing | 29/156.8 |
| 4,510,659 | 4/1985 | Okazaki | 29/156.8 |
| 4,566,810 | 1/1986 | Yoshioka et al. | 384/280 |
| 4,581,816 | 4/1986 | Klufas et al. | 29/705 |
| 4,601,087 | 7/1986 | Kawai et al. | 29/157.1 |
| 4,633,554 | 1/1987 | Clark et al. | 29/156 |
| 4,710,103 | 12/1987 | Faber et al. | 228/208 |
| 4,743,165 | 5/1988 | Ulrich et al. | 416/198 |
| 4,778,345 | 10/1988 | Ito et al. | 228/231 |
| 4,812,107 | 3/1989 | Barcella et al. | 228/231 |

*Primary Examiner*—P. W. Echols
*Assistant Examiner*—I. Cuda

[57] ABSTRACT

A turbine rotor is formed from two rotor segments that are composed of different low alloy steels, one a high temperature alloy and the other a low temperature alloy. The rotor segments have cavities in confronting faces that form an annular flange at the outer surface, with the segments welded together across the flange. A clad layer is first welded on one of the flanges and a filler material welds the clad layer to the other flange to form a composite turbine rotor.

8 Claims, 2 Drawing Sheets

METHOD OF MAKING A HIGH TEMPERATURE - LOW TEMPERATURE ROTOR FOR TURBINES

BACKGROUND OF THE INVENTION

The present invention relates to a high pressure-low pressure steam turbine and more specifically to a method of forming a turbine rotor of a high temperature compatible steel alloy and a low temperature compatible steel alloy by welding together of rotor segments composed of differing steel alloy.

Usually, turbine rotor alloys are designed for either optimum high temperature or optimum low temperature properties. The high temperature alloy has very poor low temperature properties while the low temperature alloy has very poor high temperature properties.

In the formation of a 100 to 200 Mw turbine, the rotor material becomes a major concern. The high-pressure end of the rotor must have adequate creep and fatigue properties at temperatures in the range of 1000° F. (538° C.), whereas the low-pressure end of the rotor must have a 100 ksi minimum yield strength, stress corrosion resistance, fatigue strength and fracture toughness. High temperature, pressure, rotor alloys, usually low alloy steel containing chromium, molybdenum and vanadium (CrMoV), have excellent creep properties but extremely poor fracture toughness, about 75° F. (24° C.). The low temperature, pressure, rotor alloys, usually low alloy steel containing nickel, chromium, molybdenum and vanadium (NiCrMoV), have poor creep properties above about 800° F., (427° C.).

It is an object of the present invention to provide a method of forming a turbine rotor for use in a high pressure-low pressure steam turbine that will have desirable properties in both the high temperature and low temperature regions of the turbine.

SUMMARY OF THE INVENTION

A turbine rotor is formed by welding together a first rotor segment that is comprised of a high temperature steel alloy (CrMoV) and a second rotor segment that is comprised of a low temperature steel alloy (NiCrMoV). The end faces of the rotor segments are provided with a cavity that extends radially from the axial center line of the segments to a location spaced from the outer surface of the segments to form an axially extending annular flange on each of the rotor segments that are to be welded together.

The annular flange of the high temperature rotor segment has a clad layer welded on the surface, the clad layer inspected, and the clad layer is then machined to provide a smooth surface, and heat treated, and the weld inspected again. The first and second rotor segments are aligned with their end faces confronting and parallel to each other and with the annular flanges in spaced adjacent relationship to form a welding root opening, and the two segments are welded together across the root opening to form a juncture weld. After formation of the juncture weld, the weld is heat treated and machined so as to form a smooth surface on the weld complimentary with the outer surfaces of the first and second rotor segments and no final inspection made, so as to produce a rotor of differing alloys along the axial length of the rotor.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION

In combination high pressure: high temperature—low pressure: low temperature turbines, the practice has been generally to use separate rotors for the two regions of the turbine due to the adverse effect of the environment in one region on the rotor material that was best suited for use in the other region.

The present invention is useful in the formation of a steam turbine rotor that comprises differing low alloy steel compositions along the axial length of the rotor.

Figure 1:
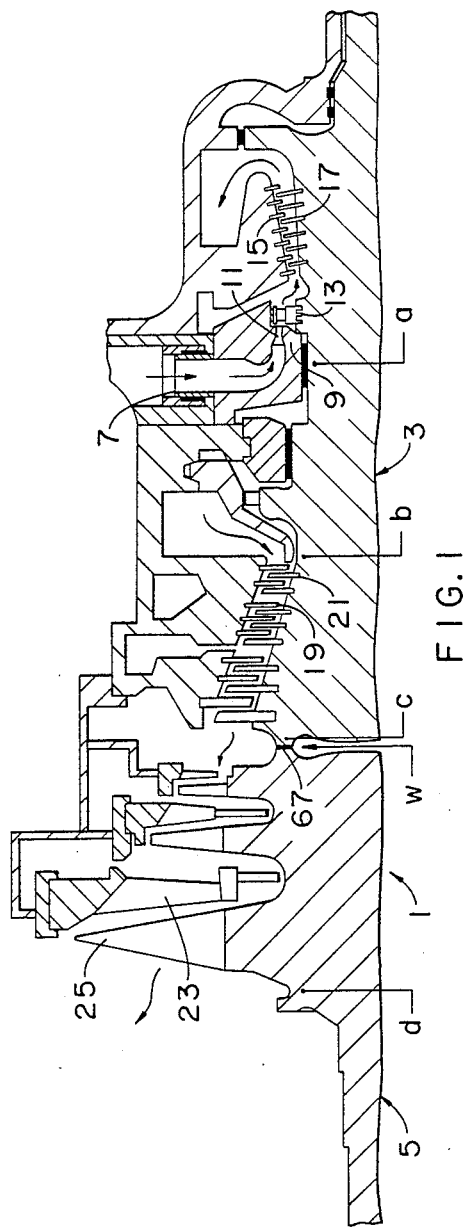
FIG. 1 is a partial sectional view of a turbine containing a rotor formed according to the present invention.

A typical steam flow path past the rotor of a high temperature—low temperature turbine is illustrated in FIG. 1, which includes a high temperature-high pressure, first rotor segment 3 of the rotor and a low temperature-low pressure, second rotor segment 5. After entry through an inlet nozzle 7, the steam flows, as shown by the arrows, through a nozzle block 9 which contains stationary vanes 11 that control the expansion of the steam and impact the desired directional flow to the steam prior to entry into and subsequent expansion through control stage rotatable blades 13 attached to the high temperature, first segment 3 of the rotor 1.

After this initial expansion, the steam expands through alternating arrays of stationary blades 15 and rotatable turbine blades 17 so as to impart motion to the rotatable turbine blades 17 and thus the turbine rotor 1. After undergoing initial expansion, the steam flow is reversed and flows to a further array of alternating stationary blades 19 and rotatable blades 21, still along the high temperature, first segment 3 of the rotor 1. After passage through that further array of blades, the steam and rotor have been cooled and the steam passes through a final array of stationary blades 23 and rotatable blades 25 prior to discharge.

The temperature of the steam to which the rotor is subjected drops considerably from the high temperature segment 3 to the low temperature segment 5 of the rotor 1. For example, at point a, where the injected steam contacts the rotor 1, the temperature of the metal of the rotor will be about 950° F. (510° C.) with the steam pressure being about 1800 psi. After flow through the array of blades 15 and 17, and reversal of the direction of the steam, the temperature of the metal of the rotor, at point b, will still be about 950° F. (510° C.) while the steam pressure drops to about 500 psi. Upon exiting from the second array of blades 19 and 21, the temperature of the metal of the rotor, at point c, will be only about 300° F. (149° C.) with the pressure of the steam dropping to about 18 psi, while upon exiting from the final array of blades 23 and 25, the rotor metal temperature at point will be about 90° F. (32° C.) with the pressure at atmospheric or slightly below atmospheric.

Figure 2:
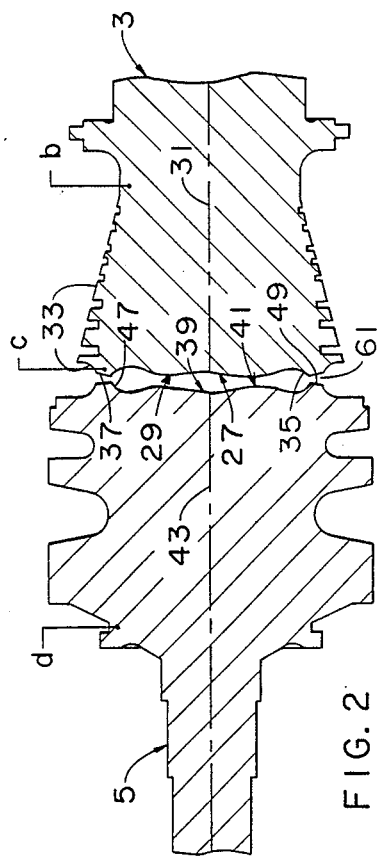
FIG. 2 is a partial sectional view of two rotor segments aligned for welding according to the present invention.

Referring now to FIGS. 2 to 6, the present method of forming a turbine rotor from rotor segments where the segments are composed of different ferrous alloys is illustrated. In FIG. 2, two rotor segments, a first segment 3 and a second segment 5 are shown prior to welding. The rotor segments shown do not have a central axial bore therethrough, and the present invention is useful with solid rotor segments, although it is to be understood that the invention may be used in connection with bored rotor segments, to produce a rotor with an axial bore therethrough.

A first rotor segment 3 is of a ferrous alloy that is a high temperature alloy that has sufficient creep and fatigue strength at about 1000° F. (538° C.). An especially useful alloy is a low alloy steel, usually containing less than about 6 percent of alloying materials. A preferred composition of the steel alloy for use in the first rotor segment is the Cr-Mo-V alloy, A470, class 8 and its modified versions. A most preferred composition is a steel alloy containing 0.27 to 0.34 percent by weight C, 0.70 to 1.0 percent Mn, less than 0.12 percent P and S, 0.20 to 0.35 percent Si, less than 0.50 percent Ni, 1.05 to 1.35 percent Cr, 1.00 to 1.30 percent Mo, and 0.21 to 0.29 percent V, less than 0.15 percent Cu, less than 0.010 percent Al, less than 0.0015 percent Sb, less than 0.015 percent Sn and less than 0.020 percent As. While the carbon content of these typical high temperature alloys are between 0.28 and 0.35, such a range may require use of high preheat temperatures of about 375° to 400° F. (191° to 204° C.) in welding. In the present method, in order to accommodate better weldability of the CrMoV rotor, the carbon content of the alloy may be lowered to about 0.20 to 0.25 percent. This permits use of a lower preheat for welding, from about 375° to 400° F. (191° to 204° C.) to about 325° to 350° F. (163° to 177° C.).

The first rotor segment 3, of a Cr-Mo-V alloy, is provided with a first end face 27 that has a cavity 29 formed therein, the cavity 29 extending radially outwardly from the longitudinal axial center line 31 of the first rotor segment. The cavity 29 terminates spaced from the outer surface 33 of the rotor segment 3 such that a first annular flange 35 is formed which extends axially and terminates as an axially facing surface 37.

A second rotor segment 5 is of a ferrous alloy that is a NiCrMoV low temperature alloy having a 100 ksi minimum yield strength, and sufficient stress corrosion resistance, fatigue strength and fracture toughness An especially useful alloy is a low alloy steel, usually containing less than about 7 percent alloying materials and a nickel content of 3.25 to 3.75 percent. A preferred composition is a steel alloy containing up to 0.35 percent C, 0.20 to 0.40 percent Mn, up to 0.012 percent P, up to 0.012 percent S, up to 0.12 percent Si, 3.25 to 3.75 percent Ni, 1.50 to 2.00 percent Cr, 0.30 to 0.60 percent Mo, 0.07 to 0.15 percent V, 0.20 percent Cu, 0.015 percent Al, up to 0.0015 percent Sb, up to 0.015 percent Sn and 0.020 percent As.

The second rotor segment 5, of a NiCrMoV alloy, is provided with a second end face 39 that has a cavity 41 extending outwardly from the longitudinal axial center line 43 of the second rotor segment. The cavity 41 terminates spaced from the outer surface 45 of the rotor segment 5 such that a second annular flange 47 is formed which extends axially and terminates as an axially facing surface 49.

Figure 3:
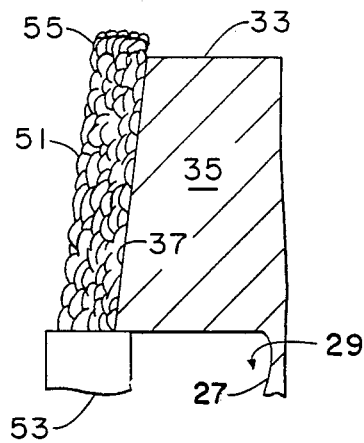
FIG. 3 is a schematic illustration showing the formation of a clad layer on the axially extending surface of the flange of the high temperature alloy rotor segment.
Figure 4:
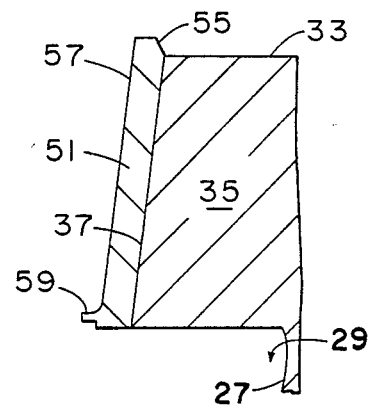
FIG. 4 is a schematic, sectional illustration similar to FIG. 3 after machining of the clad layer.

In order to weld the rotor segment 3 and 5 together, a juncture weld is effected across the annular flanges 35 and 47, but a clad layer must first be provided, and a filler material used that will be compatible with both the high temperature rotor segment alloy and the low temperature segment alloy. As illustrated in FIG. 3, a clad layer 51 is applied, by welding, to the axially facing surface 37 on the first annular flange 35 of rotor segment 3, the high temperature, CrMoV alloy segment. A backup ring 53 of a material such as copper or a NiCrMoV steel alloy material may be used, and a portion 55 of the clad layer 51 extends beyond the outer surface 33 of the first rotor segment 3. As illustrated, the axially facing surface 37 is preferably inclined at an angle from the outer surface 33 of the annular flange 35 to the axial center line, and the clad layer 51, formed from built-up layers of clad material, applied thereto also provide an inclined surface relative to the axial center line of the rotor segment 3. Preheating for this weld is effected to accommodate the requirements of the CrMoV rotor, e.g., about 350° F. (177° C.), to eliminate weld heat-effected zone cracking. After welding of the clad layer 51 on the axial facing surface 37 of annular flange 35, the clad layer is machined so as to provide a smooth surface 57, which surface is also an inclined surface. This clad weld layer is nondestructively examined, such as by magnetic particle and ultrasonic inspection to insure the quality of the weld. As shown in FIG. 4, the machining also, preferably, forms a first axially extending annular ring 59 on the clad layer 51, spaced from the cavity 29 formed in the face 27 of the high temperature alloy rotor segment 3.

The applied clad layer 51 and contiguous section of the annular flange 35 of the rotor segment 3 are then heat treated at a temperature of between about 1125° to 1225° F. (607° to 663° C.), and most preferably at a temperature of about 1175° F. (635° C.). The postweld heat treatment of the clad and contiguous section of the annular flange, or heat affected zone (HAZ), is selected to be high enough to temper the CrMoV rotor segment HAZ to avoid excess hardness and eliminate a degradation of properties, viz, creep, fatigue and fracture toughness. If this heat treatment were used later with the rotor segment 5, a serious degradation of the low pressure material would occur. The clad weld layer is then again magnetic particle and ultrasonically inspected.

Figure 5:
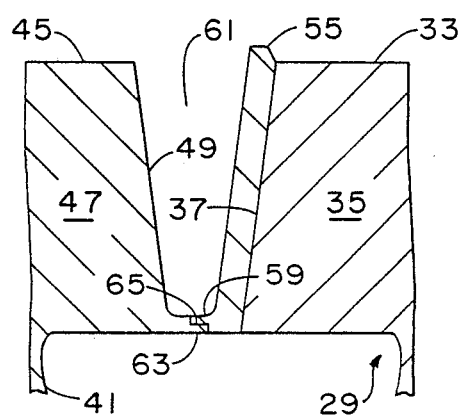
FIG. 5 is a schematic, sectional illustration showing the flange of the first rotor segment, with the clad layer thereon, in spaced adjacent relation to the flange of the second or low temperature alloy rotor segment in preparation for a juncture weld.

After application and inspection of the clad layer 51 on the surface 37 of the annular flange 35 and machining thereof, the first rotor segment is aligned with the second rotor segment 5, with the axial center line 31 thereof along a common axis with the axial center line 43 of the second rotor segment 5, and with the end faces 27, 39 in confronting relationship. The alignment is also effected such that first annular flange 35 of the first rotor segment 3 is in spaced adjacent relationship with the second annular flange 47 of the second rotor segment 5, with a root opening 61 formed therebetween. As illustrated in FIG. 5, the facing surface 49 of the second annular flange 47 of second rotor segment 5 is also an inclined surface and is preferably machined so as to provide a second annular ring 63 with a step 65 formed therein. With the flanges 35 and 47 in spaced adjacent relationship, the first annular ring 59 overlies the second annular ring 63, and seats within the step 65. By providing the inclined surfaces on the axially facing surfaces of the flanges, the surfaces converge from the outer surfaces 33 and 45 of the rotor segments 3 and 5 towards the common axial center line of the rotor segments to form a V-shaped welding root opening 61 (FIG. 5).

Figure 6:
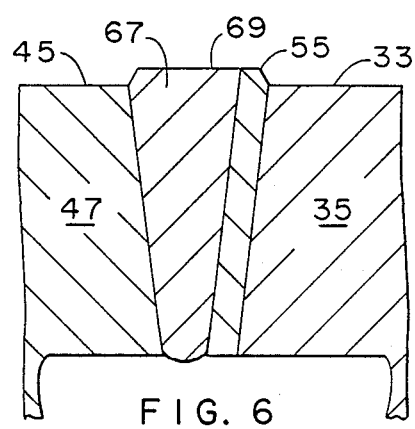
FIG. 6 is a schematic, sectional illustration of the flanges of the first and second rotor segments after formation of the juncture weld to form the rotor.

The first and second rotor segments 3 and 5 are then welded together across welding root opening 61 between flanges 35 and 47 to form a juncture weld 67, using a filler material compatible with the material of the two different rotor segments. Preferably, a portion 69 of the weld 67 extends beyond the outer surfaces 33 and 45 (FIG. 6). When the juncture weld is made, the weld joins the clad metal to the NiCrMoV rotor segment, or second segment 5. The weld requires only minimal preheat, about 100° to 125° F. (38° to 52° C.). This lower preheat minimizes the chance for the formation of weld porosity due to the air currents from the preheating disrupting the inert gas shielding, if a gas tungsten arc or gas metal arc welding process are used. The feature of joining the filler metal material to the NiCrMoV rotor segment is particularly important for the root (initial) weld pass where cracking would occur if CrMoV were joined to NiCrMoV with a relatively thin weld under severe restraint and fusing a material combination that would crack under these conditions.

The filler material used for the weld is one which is usable to weld low-pressure, NiCrMoV rotors having adequate toughness, strength acceptable at potential postweld heat treatment temperature, and adequate yield strength. A particularly useful such filler material is described in U.S. application Ser. No. 727,175 filed Apr. 25, 1985 (W.E. 52,192), now abandoned, which application was incorporated by reference in U.S. Pat. No. 4,633,554 (W.E. 52,618), issued Jan. 6, 1987, said application and said patent being incorporated by reference herein. The filler material described therein has a composition in percent by weight: 0.090 to 0.110 C, 1.25 to 1.80 Mn, up to 0.010 P, up to 0.010 S, 0.20 to 0.50 Si, 1.40 to 2.10 Ni, up to 0.30 Cr, 0.25 to 0.55 Mo, up to 0.05 V, up to 0.10 Ti, up to 0.10 Zr, up to 0.10 Al, up to 0.20 Cu, up to 0.0015 Sb, up to 0.015 Sn, up to 0.020 As, and up to, in ppm, 35 O, 25 N and 10 H, the balance being iron.

The juncture weld is then subjected to a postweld heat treatment by heating the same to a temperature of between 1075° to 1175° F. (580° to 635° C.), and preferably at a temperature of about 1125° F. (607° C.). The postweld heat treatment temperature for the juncture weld 67 is lower than the clad layer weld temperature and is selected to produce optimum properties in the weld without affecting the clad layer 51 or contiguous section of the annular flange 35 properties. Following heat treating, the juncture weld is machined to form a smooth surface thereof complementary with the outer surface 33 of the first rotor segment 3 and the outer surface 45 of the second rotor segment 5.

As illustrated in FIGS. 1 and 2, the location of the weld between the two rotor segments is an important feature. The location provides free access to welding at a straight cylindrical location not interrupted by changing diameters caused by blade grooves. The location, as shown and indicated at line w in FIG. 1 following the second array of blades 19 and 21, is in the lower temperature end of the rotor. This allows the use of the aforedescribed filler material used to weld low-pressure, NiCrMoV, rotors. It is expected that for a typical high temperature—low temperature rotor of a length, between shaft portions, of about 130.5 inches (331.5 cm) and a diameter of between about 53 to 55 inches (135 to 140 cm) at the weld location w illustrated, a flange and weld radial length of between about 3 to 4 inches (7.6 to 10 cm), using a clad layer thickness of about 0.5 inch (1.27 cm) should be sufficient to provide a secure rotor formed from two rotor segments.

The welding procedures used are preferably either gas tungsten arc welding (GTAW) or gas metal arc welding (GMAW). Gas tungsten arc welding has previously been used for repairing rotors and offers relatively high ultrasonic quality, requires little, if any, preheat, and produces weldments having tensile and impact properties which exceed rotor material specification requirements. Low alloy steel weldments produced by the GTAW process typically have a yield strength of about 90 to 115 ksi (621 to 793 Mpa), and a room temperature Charpy toughness of about 160 to 210 ft-lbs. (217 to 286 J). Gas metal arc welding has also been used for repairing rotors. For CrMoV rotor repair welding, the GMAW process weldments typically have a yield strength of about 85 to 100 ksi (586 to 689 MPa), and a room temperature Charpy toughness of about 110 to 130 ft-lbs (150 to 177 J). A third welding process, submerged arc welding, is also applicable, but tests show that this process has several problems, viz, lower weld ultrasonic quality and lower heat affected zone mechanical properties and cracking problems.

The present invention provides a method of forming a high temperature—low temperature rotor from rotor segments. By following the steps of the present method, the optimum quality and properties are obtained in the weld (low pressure filler material) without compromising the properties of either rotor material of the rotor segments and the resultant rotor.

What is claimed is:

1. A method of forming a turbine rotor from separate rotor segments comprised of different alloy materials comprising:

providing a first rotor segment, of an alloy material, having a longitudinal axial center line, an outer surface, and a first end face, with a cavity in said first end face, extending radially from the axial center line of said first rotor segment to a location spaced from the outer surface thereof, forming a first axially extending annular flange having an axially facing surface;

providing a second rotor segment, of another alloy material, having a longitudinal axial center line, an outer surface, and a second end face, with a cavity in said second end face, extending radially from the axial center line of said second rotor segment to a location spaced from the outer surface thereof forming a second axially extending annular flange having an axially facing surface;

welding a clad layer of filler material onto the axially facing surface of the annular flange of the first end face, with a portion thereof extending beyond the outer surface of said first rotor segment;

machining the clad layer so applied to provide a smooth surface thereon;

heat treating said applied layer and contiguous section of the annular flange of said first rotor segment;

aligning said first and second rotor segments with said end faces confronting each other and said annular flanges in spaced adjacent relationship to provide a welding root opening therebetween;

welding said first and second rotor segments together across said welding root opening to form a juncture weld, with a portion of said weld extending beyond the outer surfaces thereof;

heat treating said juncture weld; and machining said juncture weld to form a smooth surface thereof complementary with the outer surface of said first and second rotor segments.

2. The method of forming a turbine rotor from separate rotor segments comprised of different alloy materials as defined in claim 1, wherein the axially facing surfaces of said axially extending flanges are inclined surfaces converging from the outer surface of the rotor segments towards the respective axial centerline of said first and second rotor segments.

3. The method of forming a turbine rotor from separate rotor segments comprised of different alloy materials as defined in claim 2, wherein the alloy material of said first rotor segment consists essentially of a ferrous alloy containing chromium, molybdenum and vanadium, and the alloy material of said second rotor segments consists essentially of a ferrous alloy containing nickel, chromium, molybdenum and vanadium.

4. The method of forming a turbine rotor from separate rotor segments comprised of different alloy materials as defined in claim 3, wherein said applied layer and contiguous section of the annular flange of said first rotor segment are heat treated at a temperature of between 607° to 663° C.

5. The method of forming a turbine rotor from separate rotor segments comprised of different alloy materials as defined in claim 4, wherein said applied layer and contiguous section of the annular flange of said first rotor segment are heat treated at a temperature of about 635° C.

6. The method of forming a turbine rotor from separate rotor segments comprised of different alloy materials as defined in claim 4, wherein said juncture weld is heat treated at a temperature of between 580° to 635° C.

7. The method of forming a turbine rotor from separate rotor segments comprised of different alloy materials as defined in claim 6, wherein said juncture weld is heat treated at a temperature of about 607° C.

8. The method of forming a turbine rotor from separate rotor segment comprised of different alloy materials as defined in claim 2, wherein the machining of the clad layer forms a first axially extending annular ring on the clad layer adjacently spaced from the cavity formed in the end face of said first rotor segment, a second axially extending annular ring is machined in the axially facing surface of said second annular ring adjacent the cavity formed in the end face of said second rotor segment, and said first and second annular rings are positioned in overlying contact prior to welding of said first and second rotor segments to form said juncture weld.

* * * * *